(12) United States Patent
Rychard et al.

(10) Patent No.: US 11,413,707 B2
(45) Date of Patent: Aug. 16, 2022

(54) MARKING SYSTEM AND LASER CUTTING MACHINE

(71) Applicant: Bystronic Laser AG, Niederonz (CH)

(72) Inventors: Christoph Rychard, Wynigen (CH); Ernest Imboden, Steinhof (CH)

(73) Assignee: BYSTRONIC LASER AG, Niederoenz (CH)

( * ) Notice: Subject to any disclaimer, the term of this patent is extended or adjusted under 35 U.S.C. 154(b) by 101 days.

(21) Appl. No.: 16/597,739

(22) Filed: Oct. 9, 2019

(65) Prior Publication Data

US 2020/0114470 A1  Apr. 16, 2020

(30) Foreign Application Priority Data

Oct. 10, 2018 (DE) .......................... 102018125084.3
Mar. 22, 2019 (EP) ..................................... 19164623
Apr. 10, 2019 (DE) .......................... 202019102050.4

(51) Int. Cl.
*B23K 26/362* (2014.01)
*B23K 26/08* (2014.01)

(52) U.S. Cl.
CPC ........ *B23K 26/362* (2013.01); *B23K 26/0876* (2013.01)

(58) Field of Classification Search
CPC ............ B23K 26/0876; B23K 26/0884; B23K 26/355; B23K 26/362; B23K 26/38; G06K 1/12
USPC ..................................................... 219/121.68
See application file for complete search history.

(56) References Cited

U.S. PATENT DOCUMENTS

| | | | |
|---|---|---|---|
| 4,214,520 A | 7/1980 | Eissel | |
| 4,930,912 A * | 6/1990 | Speicher | B44B 5/026 400/48 |
| 6,923,877 B1 * | 8/2005 | Anderson | B23K 26/18 118/620 |
| 7,171,738 B2 * | 2/2007 | Dick | B27M 1/08 29/563 |

\* cited by examiner

*Primary Examiner* — Dana Ross
*Assistant Examiner* — Joseph W Iskra
(74) *Attorney, Agent, or Firm* — Workman Nydegger

(57) ABSTRACT

A marking system configured for marking a metallic workpiece is provided. The marking system includes an interface configured to receive information about parts to be cut out of the workpiece. A marking unit is movable over a processing area configured to receive the workpiece. The marking unit is configured to provide parts to be cut with a marking identifying the respective part to be cut before the cutting process from the workpiece.

8 Claims, 2 Drawing Sheets

MARKING SYSTEM AND LASER CUTTING MACHINE

BACKGROUND OF THE INVENTION

1. The Field of the Invention

The invention relates to a marking system and laser cutting machine. In particular, the invention relates to a marking system configured for marking a metallic workpiece according to claim 1 and a laser cutting machine configured for cutting parts of a metallic workpiece according to claim 6.

2. The Relevant Technology

With increasing digitization, continuous identification of the produced parts is becoming more and more important. The parts should be automatically recognized by codes in order to be able to transport, process and track them. This is the basis for automated and unmanned production.

BRIEF SUMMARY

The object of the invention is now to avoid the disadvantages of the prior art and to provide an improved marking system or an improved laser cutting machine.

This object is achieved by a marking system according to claim 1 or a laser cutting machine according to claim 6.

The marking system according to the invention is configured to mark a metallic workpiece and comprises an interface configured to receive information about parts to be cut out of the workpiece; a marking unit which can be moved over a processing area configured for receiving the workpiece; wherein the marking unit is configured to provide parts to be cut with a mark identifying the respective part to be cut before the cutting process from the workpiece.

According to the invention, there is a spatial and temporal separation of the application of the marking from the cutting process. The parts to be cut are provided with a marking identifying the respective part to be cut on the entire workpiece, such as for example a metal sheet or blank metal sheet or a tube. The workpiece may be a whole, i.e. not cut, or also a partially cut workpiece. The markings may be of any kind, for example: Part numbers, QR codes, notes, company names, product names and many more. Thus, even before the laser cutting process, each part to be cut, in particular sheet metal part or tube part, has its own individual marking. Since the marking is made before the laser cutting, it is irrelevant for the application of the marking whether parts may slip and tilt from the exchange table during cutting and moving.

The marking system according to the invention has the advantage that the marking of the parts occurs before the laser cutting and outside of the laser cutting machine in order to shorten the current processing time of the laser cutting machine consisting of engraving and laser cutting. By marking the parts outside the laser cutting machine, the processing time per cutting plan can be significantly reduced without sacrificing the marking. The marking is useful for subsequent processing steps. For example, an operator of a press brake may, for example, scan a QR code and the partly relevant bending plan is displayed on the control panel. This can increase the reliability of production.

It can be provided that the marking unit comprises a print head. For example, an inkjet print head may be used. It is also possible to provide a marking unit with engraving laser and needle embosser. Different materials and surfaces can thus be marked. In addition, these markings can be more resistant. By using a print head specialized in this task, the time required for a marking can be reduced. The marking unit could also be designed to apply different colours.

It may further be provided that three translational axes and a rotary axis are provided for moving the marking unit, wherein the rotary axis is arranged perpendicular to the horizontally extending processing area. The marking unit of the marking system, or a functional part of the same, such as a printing or engraving head, can thus be moved in four axes. By moving in the X direction and Y direction, any position on the workpiece can be reached. By moving in the Z-direction, different distances to the workpiece surface can be compensated, which occur, for example, as a result of different sheet thicknesses. Further, a marking can be applied in each orientation direction as a result of the rotation axis. The rotation axis is advantageously arranged on an axis positioned in the Z direction.

It can be provided that a distance sensor is provided, which is configured to measure the distance between the marking unit and the workpiece. The distance sensor may, for example, operate optically or capacitively. Accurate distance measurement can increase the readability of the marking.

It can further be provided that the information contains one or more pieces of information from the group comprising part number, part identification, lot number, material thickness, batch number and client. The information may come from one or more of the groups of parts-related information, material information, job information, processing information. Such information can directly support subsequent processing steps such as laser cutting and also subsequent processing steps such as bending as a result of these machines or their operators reading the information from the markings.

A laser cutting machine according to the invention having a laser cutting head in a laser processing space configured for cutting parts from a metallic workpiece comprises a marking system, which is arranged outside the laser processing area, as described above. The same advantages and modifications apply as described above. Especially for fast-working and cost-intensive laser cutting machines, the use of a marking system that is external to the processing area of the laser cutting machine offers an advantage. As a result of the arrangement of the marking system outside of the laser processing area, contamination of the marking system by cutting operations is avoided and marking can be carried out simultaneously to the laser processing so that time is saved. The laser cutting power of a laser cutting machine according to the invention is usually in the range of at least 1 kW, preferably at least 3 kW.

It can further be provided that a changing station is provided for exchange tables and that the marking unit of the marking system is arranged to be moveable on the exchange table by means of the changing station. By applying the marking system directly at the changing station, space next to the machine tool is kept clear and not obscured for further automation equipment. Furthermore, the cut parts do not have to be marked in an additional process, which in turn costs additional transport time, working time and also with the space required therefor. In addition, this assembly is more cost-effective and does not result in an increased footprint for the production plant.

It can be provided that the processing area of the marking system is limited by the dimensions of the changing station.

In this way, the changing station and the marking system can be well matched to each other.

It may further be provided that the movable marking unit has two sliding carriages configured for moving on longitudinal members of the changing station and a crossmember arranged between the sliding carriages. This assembly of a portal bridge allows fast movement of the marking unit with undisturbed transport of the workpiece. Alternatively, more than two sliding carriages may also be provided.

Further preferred embodiments of the invention will become apparent from the remaining features mentioned in the dependent claims.

The various embodiments of the invention mentioned in this application are, unless otherwise stated in the individual case, advantageously combinable with each other.

BRIEF DESCRIPTION OF THE DRAWINGS

The invention will be explained below in exemplary embodiments with reference to the accompanying drawings. It can be seen that.

DETAILED DESCRIPTION OF THE PREFERRED EMBODIMENTS

Figure 1:
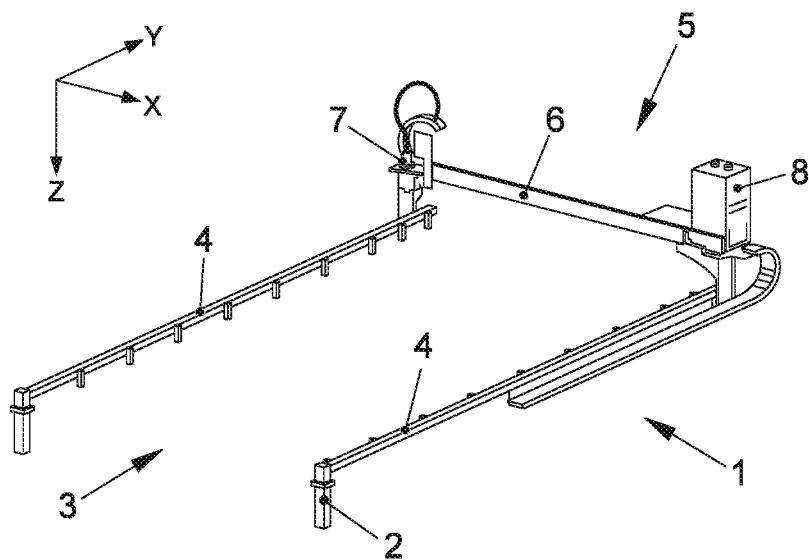
FIG. 1 is a perspective view of a marking system for marking a plate-shaped, metallic workpiece.

FIG. 1 shows a marking system 1 configured for marking a plate-shaped, metallic workpiece such as a metal plate. The marking system 1 can also be configured for marking tubular metallic workpieces, which is not shown in FIG. 1.

The marking system 1 comprises a receiving table 2 having a processing area 3 for receiving a workpiece in an XY plane. The receiving table 2 can, as shown, for example, consist of two longitudinal members 4, on which the marking unit can move.

A marking unit 5 can be moved over the processing area 3. In this example, the marking unit 5 comprises a cross member 6, which is arranged to be movable on the longitudinal members 4 in the Y direction. On the cross member 6, a print head 7 is arranged, which is movable on the cross member 6 in the X direction. Further, the print head 7 is movable in the Z direction and rotatable about the Z axis.

The marking system 1 further comprises a controller 8, which as shown here belongs directly to the marking system 1 or may be a higher-level controller. The marking system 1 or the controller 8 includes an interface configured to receive information about parts to be cut from the workpiece. The marking system 1 marks on the complete workpiece, i.e. not yet cut or separated, individual parts or blanks to be subsequently cut.

For example, the information may refer to a cutting plan of a laser cutting machine downstream in the production line. The information includes, for example, the position and orientation of the marking to be applied to the workpiece and the data content of the marking. Further information can be the outline of parts to be cut and/or information on subsequent processing steps. All or selected information is applied to the workpiece 102 by means of the marking unit 5 in order to make the respective part to be cut 108 identifiable on the basis of the marking 109. The subsequent further processing, transport and/or storage, for example, can be thus improved.

The marking 109 may consist of alphanumeric characters, graphics and/or coded information such as a QR code or barcode.

Figure 2:
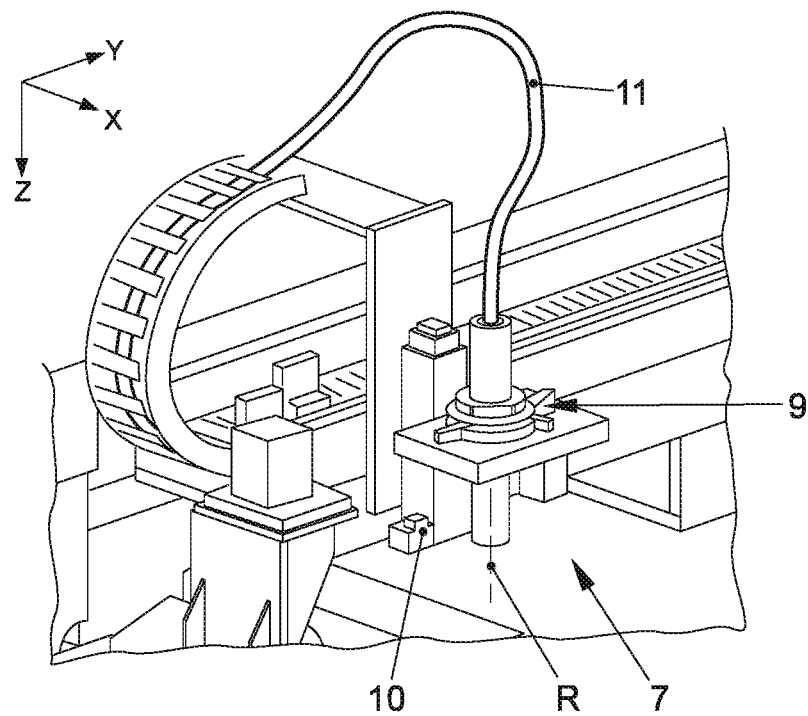
FIG. 2 is a perspective view of a print head of the marking system.

In FIG. 2, the print head 7 is shown in detail. The print head 7 comprises a printing unit 9, such as an inkjet in order to apply the marking 109 to the workpiece 102. Furthermore, a distance sensor 10 is provided to measure the distance between the marking unit 5 or print head 7 and the workpiece. The print head 7 is rotatable about a rotation axis R. In this example, the rotation axis R is in the Z axis. Through the rotation axis R along the Z-axis, the orientation of the marking can be changed in the printing plane and assume any orientation between 0 and 360°.

The print head 7 is supplied with energy and optionally with consumable material, for example ink, for the printing unit 9 via a supply line 11. In addition, signals of the distance sensor 10 can be transmitted to the controller 8.

Figure 3:
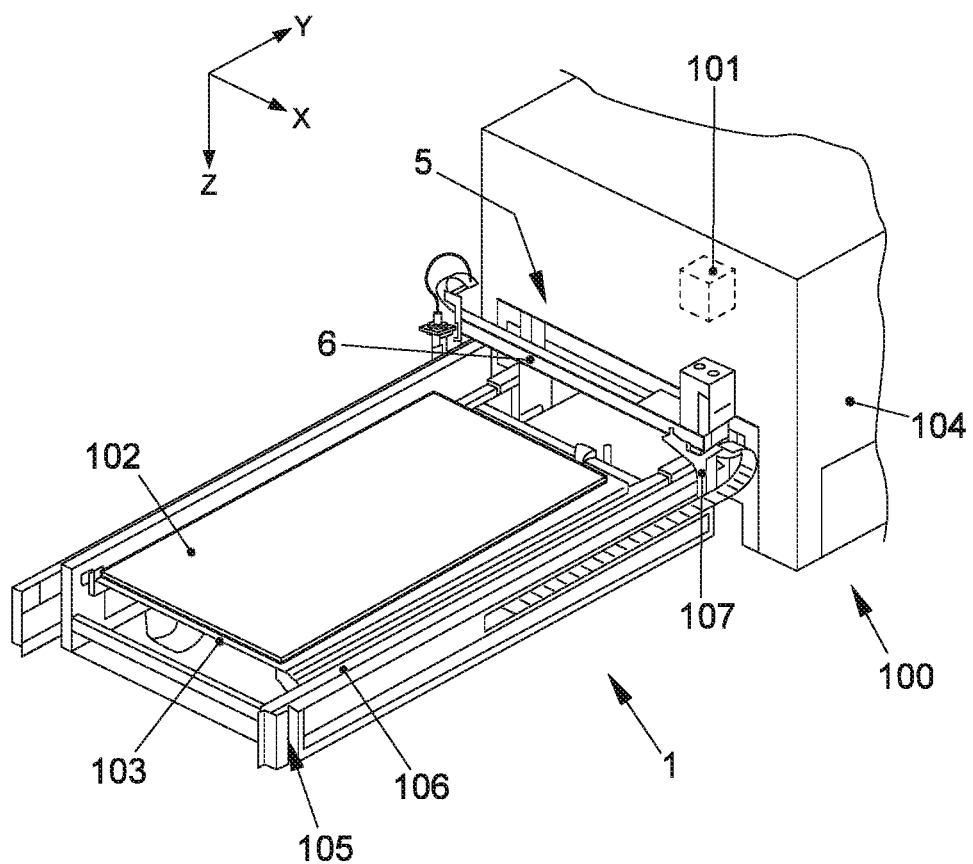
FIG. 3 is a perspective view of a laser cutting machine having a marking system.

FIG. 3 shows a laser cutting machine 100 having a laser cutting head 101 configured for cutting parts from a metallic workpiece 102, which is plate-shaped in this case. The laser cutting machine 100 is equipped with the marking system 1. The laser cutting machine 100 or the laser cutting head 101 is configured to cut workpieces 102, such as metal sheets or metal plates. For this purpose, a laser cutting power in the range of usually at least 1 kW, preferably greater than or equal to 3 kW is provided. The laser cutting head 101 is arranged in a laser processing area 104.

An exchange table 103 of the laser cutting machine 100 is provided for receiving at least one workpiece 102. The laser cutting machine 100 further has a changing station 105 for the exchange table 103, which is arranged outside the laser processing area. The marking unit 5 of the marking system 1 is arranged to be moveable on the changing station 105 by means of the exchange table 103. The exchange table 103 corresponds to the processing area of the marking system 1, or the processing area 3 of the marking system 1 is limited by the dimensions of the changing station 105.

The movable marking unit 5 has two sliding carriages 107 configured for moving on or at sides of the longitudinal members 106 of the changing station 105. The two or more sliding carriages 107 permit a movement of the marking unit 5 in the Y direction, i.e. in the direction of the workpiece movement or of the laser processing area 104. A cross member 6 is arranged between the sliding carriages 107. The print head 7 may be arranged on the cross member 6.

The marking system 1 may be controlled by a controller of the laser cutting machine 100 or connected to the controller. In this way, information such as the positions of the markings to be applied or a cutting plan can be transmitted and/or the processing steps and times of the two machines can be coordinated.

Figure 4:
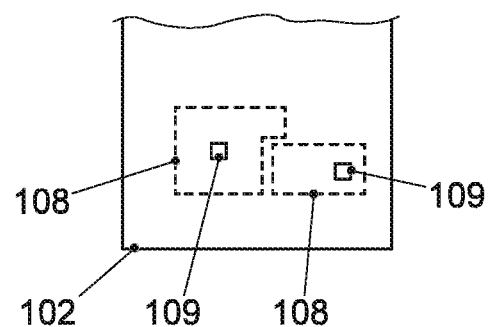
FIG. 4 is a schematic view of a workpiece with markings.

FIG. 4 shows a section of a workpiece 102 with two parts to be cut 108. The parts to be cut 108 are shown with dotted lines, as these parts 108 are only cut in a cutting process following the marking process. The marking system 1 can receive these outlines directly or determine the same from a received cutting plan. According to the parts to be cut 108, markings 109 are applied by the marking system 1. At least one marking 109 is thus applied to each part to be cut 108, which permits a clear identification of the part 108 and/or contains information on further processing steps.

A method of marking a metallic workpiece may comprise the following steps:

Receiving information about parts to be cut from the workpiece;

Moving of a marking unit to a part to be subsequently cut; and

Marking of the part to be cut with a marking identifying the part to be cut.

Cutting the part subsequently may, in this context, mean that all the parts to be cut are first marked on the uncut workpiece and then the marked parts are cut out of the workpiece in another machine tool such as a laser cutting machine.

The marking system can derive time-optimized and/or distance-optimized path planning for the marking unit 5 or the printing or engraving head from the information received, such as the positions of the markings to be applied or a cutting plan. This path planning takes into account all, in this example, four axes of the marking unit.

The marking system presented here allows a fast marking of the parts to be cut on the entire workpiece which is decoupled from the actual cutting process. Due to the temporal and spatial separation of the marking from the cutting, the laser cutting machine in particular can be operated more efficiently.

What is claimed is:

1. A marking system configured for marking a metallic workpiece that is delivered to a laser processing area configured for cutting parts from the metallic workpiece by a laser enclosed with the laser processing area that has an opening to receive the metallic workpiece, comprising:
    an interface configured to receive information about parts to be cut out of the workpiece;
    a marking unit that is movable over a processing area configured to receive the workpiece, the processing area being disposed outside of the enclosed laser processing area to prevent contamination of the marking system by cutting parts from the workpiece;
    wherein the marking unit is configured to provide parts to be cut with a marking identifying a shape of the respective part to be cut before the cutting process from the workpiece, and
    wherein three translational axes and a rotary axis are provided for moving the marking unit within the processing area and vertically above the workpiece, wherein the rotary axis is arranged perpendicular to the horizontally extending processing area.

2. The marking system according to claim 1, wherein the marking unit comprises a print head.

3. The marking system according to claim 1, further comprising a distance sensor, which is configured to measure a distance between the marking unit and the workpiece.

4. The marking system according to claim 1, wherein the information includes one or more pieces of information from the group comprising part number, part identification, order number, lot number, material, material thickness, processing time, batch number, part history, further processing steps and client.

5. A laser cutting machine comprising:
    a laser cutting head in a laser processing area configured for cutting parts from a metallic workpiece, the laser cutting head being enclosed within the laser processing area that has an opening configured to receive the metallic workpiece sliding through the opening;
    a marking system which is arranged outside the laser processing space to prevent contamination of the marking system by cutting parts from the metallic workpiece, the marking system comprising:
        an interface configured to receive information about parts to be cut out of the workpiece;
        a marking unit that is movable over a processing area configured to receive the workpiece;
        wherein the marking unit is configured to provide parts to be cut with a marking identifying the respective part to be cut before the cutting process from the workpiece, and
    wherein three translational axes and a rotary axis are provided for moving the marking unit, wherein the rotary axis is arranged perpendicular to the horizontally extending processing area.

6. The laser cutting machine according to claim 5, further comprising a changing station for exchange tables, wherein the marking unit of the marking system is arranged to be moveable on the exchange table by means of the changing station.

7. The laser cutting machine according to claim 5, wherein the processing area of the marking system is limited by the dimensions of the changing station.

8. The laser cutting machine according to claim 6, wherein the movable marking unit includes two sliding carriages configured for moving on longitudinal members of the changing station and a crossmember that is arranged between the sliding carriages.

\* \* \* \* \*